Dec. 15, 1970   N. R. JONES   3,547,720
METHOD OF TRANSFER COATING ARTICLES WITH LAYER OF
FLAME-SPRAYED CERAMIC MATERIAL
Original Filed Feb. 23, 1966

United States Patent Office 3,547,720
Patented Dec. 15, 1970

3,547,720
METHOD OF TRANSFER COATING ARTICLES WITH LAYER OF FLAME-SPRAYED CERAMIC MATERIAL
Neville Rhys Jones, St. Albans, England, assignor to Hawker Siddeley Dynamics Limited, Hatfield, Hertfordshire, England, a British company
Continuation of application Ser. No. 529,348, Feb. 23, 1966. This application May 5, 1969, Ser. No. 858,551
Claims priority, application Great Britain, Feb. 26, 1965, 8,525/65
Int. Cl. B32b *17/06, 31/26*
U.S. Cl. 156—82
8 Claims

ABSTRACT OF THE DISCLOSURE

To apply a layer of ceramic material to an article of hardware, the ceramic is first flame-sprayed, by means of a flame gun of the type used in metal spraying, on to a temporary support member of flame-resisting material, such as silicone rubber, and subsequently the exposed surface of the sprayed ceramic layer on the temporary support is applied and bonded to the article to be coated, and the support is removed. A release medium, such as a mould release agent or a layer of Ballotini glass beads, may be applied to the surface of the temporary support member before the flame-spraying operation.

---

Figure 1:
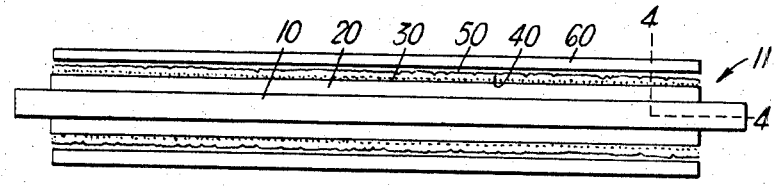

This application is a continuation of applicant's copending parent application Ser. No. 529,348 filed Feb. 23, 1966, now abandoned.

This invention relates to a process of coating articles with a layer of material applied in finely divided form by flame spraying from a gun. A particular instance is the application to a prepared surface of a layer of ceramic material, although the invention is not limited to this.

At the present time, a usual technique for applying a layer of ceramic material to an article is to spray it on by means of a flame gun, of the type used in metal spraying, after the surface of the article has been suitably treated to cause the ceramic to adhere to it. Methods of surface-treatment as a preliminary to coating with ceramic include grit blasting, metal spraying and the application of a layer of glass beads or finely divided aluminium powder to a layer of resin bonding material, the aluminium powder being subsequently sprayed with aluminium metal. The glass beads are employed particularly when it is desired that the ceramic layer shall be readily removable from the article. It follows, therefore, that the technique is limited in its application to only those surfaces which are, or can be rendered, appropriately receptive.

Perhaps more serious limitations are that only articles able to withstand the heat involved can be coated, and it is not possible to coat inaccessible surfaces that the gun spray cannot reach. It is an object of this invention to provide a technique which is not subject to the above limitations.

According to the present invention, the ceramic coating is not applied directly to the article to be coated but a transfer method is employed wherein the coating material is sprayed on to a flexible temporary support, which is first treated with a release agent if necessary, the surface of the article to be coated is bonded to the exposed surface of the coating material on the flexible support, and then the flexible support is removed.

The term ceramic as used herein is intended to include any sprayable glass composition or refractory material. It is to be noted that molybdenum and tungsten, for example, must be sprayed in a protective atmosphere as is well known and also other refractory products such as silicon carbide cannot be sprayed because they dissociate at atmospheric pressure at or near their melting point.

By flexible temporary support is meant any coherent flexible backing material which is not degraded in or by accepting the ceramic coating applied thereto.

Flame spraying by gun as discussed herein is intended to include both acetylene and electric arc flame gun techniques.

Preferably, the bonding is by means of a curable resin adhesive, such as an epoxy resin. This gives a very high bond strength between the article and the coating, that is to say many times greater than in the case of coatings applied by the conventional method. Furthermore, whereas the coating, if it is a ceramic material, is porous and so does not protect a metal article against corrosion, the epoxy resin layer can give this protection. Also it is possible to incorporate a corrosion-inhibiting primer or the like, for example by applying it directly to the surface to which the ceramic coating is to be applied.

Since the resin adhesive has a temperature limitation, the technique of the invention is not generally suitable for use in the production of ceramic-coated articles that are likely to encounter very high temperature for long periods. But short time exposure to high temperature can often be tolerated.

The surface of a ceramic coating applied by the transfer method is generally smoother than is obtained by the conventional spraying technique, resembling a ground surface, and this saves grinding costs in many applications. And it is possible to obtain such a smooth coating on a curved surface of an article in circumstances where this was previously impossible or economically prohibitive.

A characteristic of ceramic coatings applied in finely divided form by spraying from a flame gun is their flexibility. This means that the temporary support can likewise be flexible thereby achieving the versatility of the technique according to the invention. While the flexibility of soft rubber would be undesirably greater than that of a ceramic coating applied thereto, a hard or stiffened rubber support may be employed with advantage; its surface can be prepared to receive the sprayed ceramic by first bonding to it a layer of glass beads such as are known as Ballotini. An instance of work that can be accomplished in this way is the use of a stiffened rubber mandrel to carry a coating for the inside of a tube of comparatively small diameter, say ¾".

A specific example of the production of ceramic coated articles by the technique of the invention will now be described by way of illustration and with reference to the accompanying diagrammatic drawings.

Figure 2:
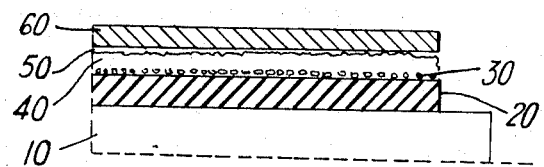

In the drawings:
FIG. 1 is a diagram illustrating the example to be described, and
FIG. 2 is a section on the line 4—4 of FIG. 1.
The drawings illustrate an example of the coating of tube bores.

The support used in this case is a mandrel 11 (FIG. 1) consisting of a silicone rubber tube 20, with an internal diameter of ¼" and an outer diameter of ½", is stiffened internally by means of a ¼" diameter metal rod. The mandrel is chosen of a diameter such that, after coating in the manner now to be described, it will be a sliding fit within the tube bore.

The rubber mandrel surface is first coated over with silicone adhesive MS2705/M27 (supplied by Midland Silicones—adhesive-pressure sensitive MOA DTD 900/4608 specification) and a layer of Ballotini glass beads 30 (grade 18) (suppliers English Glass Co. Lead glass— approx. .053 to 0.65 mm. diam., test sieve BS.410 1962— passed 200 retain 300) is applied. This is followed by the spray application of one coat of silicone release agent. Then a ceramic coating 40 about .015" thick is sprayed on until the desired thickness is attained.

Next the exposed porous surface of the ceramic is impregnated with epoxy resin 50 such as above and the mandrel is inserted into the tube 60 having an internal diameter of 0.535" and an outer diameter of 0.75" that is to be internally coated. There must be enough resin adhesive to ensure that there are no voids between the ceramic and the bore wall of the tube. The resin is cured, and finally the mandrel is removed by first withdrawing the metal rod which allows the rubber tube to be pulled at its two ends in opposite directions thereby to reduce its diameter and facilitate breaking of the bond between the Ballotini beads and the ceramic.

It should be mentioned here that, especially in the case of the use of Ballotini beads, the release agent is not essential because the bond afforded between the temporary support and the ceramic by the Ballotini beads is weaker than the bond between adhesive and the Rokide ceramic composition. However, use of a release agent appears to be helpful in breaking the temporary bond in all cases.

An interesting aspect of the transfer technique according to the invention is that, if it is desired to impregnate a ceramic or other porous coating, substantially double the thickness of coating can be impregnated as formerly because during the process the ceramic coating is accessible from both sides. Thus while it is on the temporary support it can be impregnated from the surface then exposed, which will eventually become the unexposed under surface, and when it is in place on the article to be coated it can be impregnated from the opposite surface.

A further interesting possibility is the storage or transport of sprayed coatings on a support media for subsequent application to articles required to be coated. Thus, by spraying on to rubber sheet material a store of ceramic coating ready for use could be built up, which could be transported in roll form providing the diameter of the roll were large enough to prevent the limit of flexibility of the ceramic from being exceeded.

What is claimed is:

1. A method of coating articles with a layer of flame-sprayable ceramic material applied in finely divided form by flame-spraying from a gun, comprising the steps of flame-spraying the ceramic coating material on to a temporary support of flame-resisting material, bonding the surface of the article to be coated to the exposed surface of the ceramic coating material on the support, and then removing the support, the temporary support being flexible rubber.

2. The method according to claim 1, wherein the surface of the support is treated with a release agent before the coating material is sprayed on.

3. The method according to claim 1, wherein the bonding is performed by the use of a curable resin adhesive.

4. The method according to claim 1, further comprising the step of applying a corrosion inhibiting primer to the surface of the article to be coated before the bonding step.

5. The method according to claim 1, wherein a layer of glass beads is bonded to the surface of the temporary support before the coating material is sprayed on.

6. The method according to claim 1, wherein the temporary support is of hard rubber.

7. The method according to claim 1, wherein the support is a mandrel consisting of a rubber tube stiffened internally by a withdrawable rod, and said article is a tube the bore of which is to be coated.

8. The method according to claim 1, wherein the sprayed coating material has its exposed surface treated with an impregnating material before the bonding step and a second exposed surface is likewise treated with an impregnating material after the steps of bonding and removal of the support.

References Cited

UNITED STATES PATENTS

| | | | |
|---|---|---|---|
| 2,311,876 | 2/1948 | Scheetz | 156—89 |
| 2,949,704 | 8/1960 | Jacobs | 161—206X |
| 2,968,083 | 1/1961 | Centz, et al. | 264—30 |
| 2,970,076 | 1/1961 | Porth | 156—89 |
| 2,997,413 | 8/1961 | Wagner | 161—178 |
| 3,176,584 | 4/1965 | De Vries, et al. | 161—406X |
| 3,179,531 | 4/1965 | Koubek | 117—105.2X |
| 3,218,186 | 11/1965 | De Vries | 117—29 |
| 3,340,026 | 9/1967 | Kiwak | 161—225X |
| 3,389,749 | 6/1968 | Towns, et al. | 156—245 |
| 3,364,089 | 1/1968 | Koubek, et al. | 156—232 |

HAROLD ANSHER, Primary Examiner

U.S. Cl. X.R.

117—3.2, 23, 40, 105.2; 156—232, 241, 245, 249, 280; 161—186, 193, 406